United States Patent [19]

Willey

[11] Patent Number: 5,732,965
[45] Date of Patent: Mar. 31, 1998

[54] MOUNTING SYSTEM FOR MOTORCYLE ACCESSORIES

[76] Inventor: Barry A. Willey, 727 Ela Rd., Inverness, Ill. 60067

[21] Appl. No.: 597,830

[22] Filed: Feb. 7, 1996

[51] Int. Cl.⁶ ................................................ B65H 1/00
[52] U.S. Cl. .................. 280/288.4; 180/219; 224/413; 224/448; 224/425; 296/78.1
[58] Field of Search ................ 280/288.4; 180/219; 224/413, 448, 425; 296/78.1, 201

[56] References Cited

U.S. PATENT DOCUMENTS

| | | | |
|---|---|---|---|
| 3,369,836 | 2/1968 | Haycock et al. | 296/78.1 |
| 4,066,291 | 1/1978 | Hickman | 280/288.4 |
| 4,082,345 | 4/1978 | Willey | 296/78.1 |
| 5,558,260 | 9/1996 | Reichert | 224/413 |
| 5,658,035 | 8/1997 | Armstrong | 296/78.1 |

*Primary Examiner*—Christopher P. Ellis
*Attorney, Agent, or Firm*—James T. Fitzgibbon

[57] ABSTRACT

A demountable positioning system for a windshield or other motorcycle accessory. The system includes a pair of anchors fixed to one of a motorcycle and the accessory, and a releasable latching mechanism carried by the other of the motorcycle and the accessory. The latching mechanism includes a first recess having an open end and a closed end with portions snugly engageable with and pivotable about one of said anchors. At least one latch element has a second recess including an open end and a closed end defined by surfaces for snugly engaging said other anchor. A pawl, a release lever, and a latching mechanism which includes a resilient member urging said latch and said pawl in predetermined directions are included. The latch element is movable about a pivot axis between a closed position and an open position.

22 Claims, 5 Drawing Sheets

MOUNTING SYSTEM FOR MOTORCYLE ACCESSORIES

BACKGROUND OF THE INVENTION

The present invention relates generally to motorcycle accessories and, more particularly, to quickly detachable but secure mounting systems for accessories such as windshields, saddlebags and/or so-called travel trunks.

Many years ago, most motorcycles served primarily as basic transportation. Their owners were able to take advantage of their maneuverability, economy and other inherent advantages. As the motorcycle field broadened, special purpose motorcycles became more common. Many motorcycles that were sold to those whose primary interest was long distance touring became large and complex and included an enormous variety of built-in accessories. Such motorcycles typically include fairings which cover all or most of the major engine components, saddlebags, travel trunks and the like. Such motorcycles are equipped with radios, specialized seating and other accessories of all kinds, rendering them suitable for such purposes but, in effect, rendering them less suitable for use as casual, day-to-day transportation.

In more recent years, a significant proportion of the motorcycling public has purchased what are sometimes described as "cruisers" or the like whose style and general appearance is intended to project the image that the rider is adventurous and exciting, and that his or her motorcycle presents a "custom" appearance that highlights the rider and exposes him to viewing by bystanders and/or other riders. For such owners, the riding experience comprises "profiling" or presenting this image of excitement or adventure.

Many such riders believe that such image would be compromised or damaged if the motorcycle were to be equipped with a variety of accessories having merely practical ends, i.e., windshields, saddlebags or the like.

On the other hand, however, such riders are often aware of the practical advantages of such accessories, and having invested considerable funds in the purchase of a motorcycle, do not wish to rule out the use of such accessories altogether. Accordingly, there has been a recent demand for high quality, removable accessories.

Unfortunately, while removable accessories have been known for many years, and in fact, most touring accessories including windshields and luggage carriers were originally of the "add on type", such additions have involved significant efforts. Moreover, many such systems, particularly those intended for quicker changing, have not been able to be installed reliably, especially in a matter of seconds or minutes.

Naturally, it is of great importance that where an accessory is to be added on, it be fastened in an extremely secure and reliable way so as to eliminate any reasonable possibility of becoming dislodged in use. Even where falling off is not a risk, there is the possibility that if the accessory is attached in a flimsy manner, shaking, rattles or the like will result. Still further, and very important in connection with the comparatively spontaneous desire to ride a motorcycle in its simple or "stripped down" condition as opposed to its accessorized or "dressed" condition, the change between states should be able to be achieved with minimal time and with the greatest amount of reliability and security. Desirably, the positioning action should indicate by feel, sound, or both, that it is securely attached.

In the past, so-called "quick disconnect" systems for mounting windshields and other accessories have been provided. However, several of such systems have involved at least a few disadvantages, varying in character from slight to relatively serious. Thus, some prior art motorcycle windshields are able to use manually operated fasteners, such as knobs or levers in the attachment/detachment process. The same such shields or others, may also use variations of so-called wing nuts or thumb screws to perform the attaching function. Obviously, systems wherein the mounting/dismounting of the accessory requires tools such as wrenches, pliers or the like are considered significantly disadvantageous.

The foregoing systems, and others, have sometimes involved a construction wherein after the shield or similar part has been removed, the residual portion of the fastening system has created an appearance lacking in tidiness, or held out the possibility of losing the parts which were removed for the purpose in question. Thus, the knobs, thumb screws, hose clamps and the like, while functionally satisfactory in many respects, tend to detract from the advantages of a truly ideal mounting system. In this connection, a mounting system should be one that can be carried out entirely manually.

Another advantage of an ideal system is one wherein the shield or the like may be positioned in such a way that, by "feel", the user knows the positioning is satisfactory and that locking and latching may be accomplished with little or no intentional manipulation.

Another ideal attribute of a simple mounting system is one which is extremely safe and secure and requires manipulation which, while not difficult, must be definitely accomplished in order to secure release of the windshield or other fastened accessory.

In view of the failure of the prior art to provide a truly simplified, reliable, economical and aesthetically pleasing attachment system for motorcycle windshields and other accessories, it is an object of the invention to provide such an improved mounting system.

Another object of the invention is to provide a system wherein a portion of the cooperating latching and locking mechanisms may be retained on a portion of the motorcycle in an inconspicuous location, and preferably have no moving parts.

Yet another object of the invention is to provide a mounting system wherein pairs of spaced apart "docking points" or anchors are provided to insure that, when mounted, the accessory is in a structurally strong and secure position relative to the underlying structure.

Still another object of the invention is to provide a motorcycle windshield which includes parts adapted to cooperate use with parts on the cycles to secure substantially instantaneous attachment and removal while retaining the advantages of simplicity and, very importantly, safety and security of attachment.

A further object of the invention is to provide a windshield mounting system which is adjustable for initial installation and which thereafter may be positioned and released from the motorcycle by manipulation of one or more levers or the like controlling movement of the mechanism.

It is a still further object of the preferred form of apparatus to include a mounting mechanism wherein a pair of mounting areas are provided, each of which may be engaged with a portion of the shield mounting mechanism by "feel" and thereafter simply rotated and snapped into position without the need to manipulate levers or other elements until it is desired to remove the secured accessory.

An additional object of the invention is to provide a latching and locking mechanism which is simple and able to be manufactured reliably at low cost.

Yet another object of the invention is to provide a latching mechanism which may be made from readily available, economical materials which are virtually foolproof in use.

A further object of the invention is to provide a mechanism that is readily adaptable to being secured by a lock and key arrangement.

Another object of the invention is to provide a mechanism wherein a pair of spaced apart docking points are engaged respectively by fixed and pivotally mounted recesses or notches adapted to cooperate with a headed post, with one such recess forming a part of a pivotally mounted latch whose range of movement and positioning are controlled by a locking claw on an adjacent pawl.

Yet another object of the invention is to provide a quick release mechanism which includes fixed and movable locking parts positioned by closely spaced apart plates, and wherein portions of the mechanism engage the shank portions of a headed post carried by mounting brackets on a portion of the motorcycle.

A still further object of the invention is to provide a mechanism wherein one set of cooperating elements may be located relative to the cycle and the other set of elements can be positioned on the accessory.

A further object of the invention is to provide a mechanism wherein the spring force biases the latch into an open position, thereby ejecting the windshield from the mount once it is in a predetermined release position which it reaches by depressing the pawl release lever.

A still further object of the invention is to provide a locking mechanism that has extremely thin, essentially comprising base and cover plates and having a latch mechanism made from similarly thin gauge metal lying between these plates.

Another object of the invention is to provide an accessory mounting system wherein the operative parts may be made from metal or in a suitable case, engineering plastics.

Yet another object of the invention is to provide an apparatus wherein the recesses in the operative parts of the locking mechanism may expand to and in some cases, slightly beyond the space between adjacent surfaces of the docking points or anchors so as to deflect the anchors very slightly under stress and to eliminate vibration.

The foregoing and other objects and advantages of the invention are achieved in practice by providing a latching mechanism that includes a pair of posts, anchors or like docking points affixed to the cycle or the accessory, and a cooperating latching assembly affixed to the other, with the latching assembly including a fixed and a movable recess formed in a pivotable latch for engaging portions of the docking points or anchors, with the movement of the latch being controlled by a pawl mechanism providing resilient bias and easy release of the latching mechanism.

The manner in which the foregoing and other objects and advantages of the invention are achieved in practice will become more clearly apparent when reference is made to the accompanying detailed description of the preferred embodiments of the invention set forth by way of example and shown in the accompanying drawings wherein like reference numbers indicate corresponding parts throughout.

DESCRIPTION OF THE PREFERRED EMBODIMENTS OF THE INVENTION

While the apparatus of the invention may be embodied in different forms and variations may be made in the illustrated forms of practice, a detailed description of different representative embodiments of the invention will be given, it being understood that variations to such described forms of the invention will be apparent to those skilled in the art.

Figure 1:
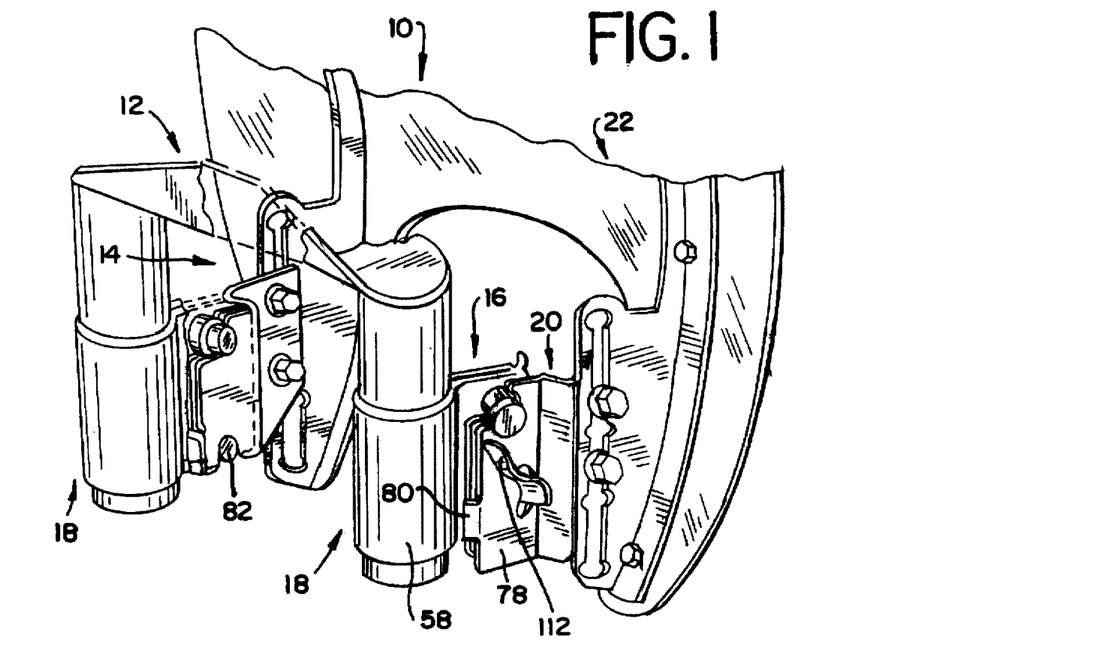
FIG. 1 is a perspective view, with portions broken away, showing a motorcycle windshield affixed to portions of the fork assembly of a motorcycle by the novel latching and release mechanism of the invention.
Figure 2:
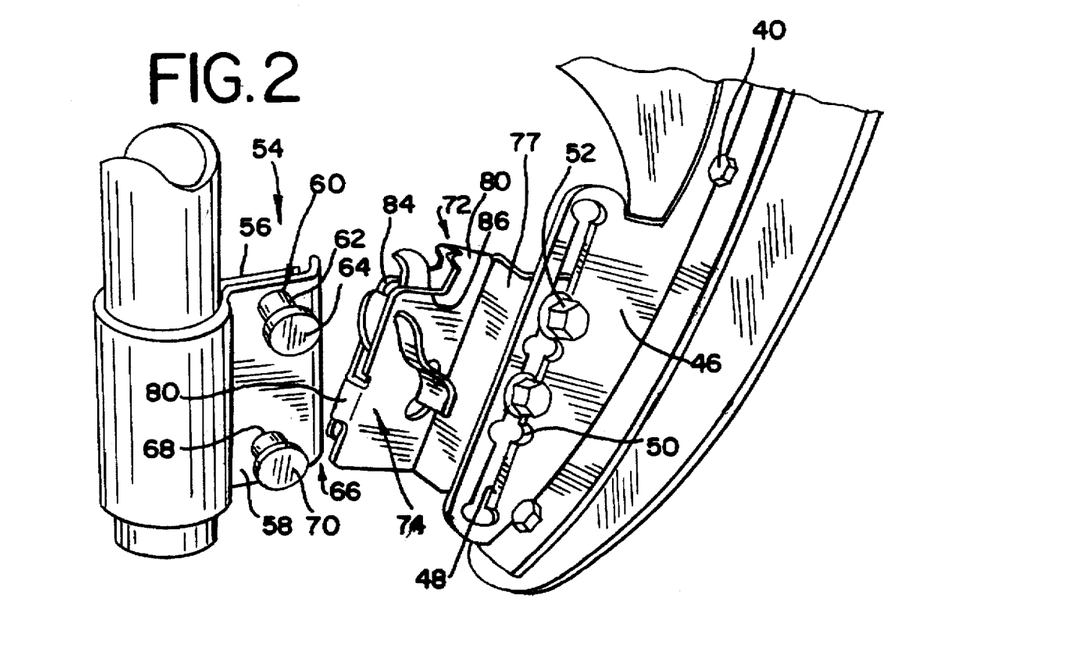
FIG. 2 is a fragmentary perspective view of a portion of the mechanism of FIG. 1, showing the manner in which the shield is removed and/or replaced.
Figures 3, 4:
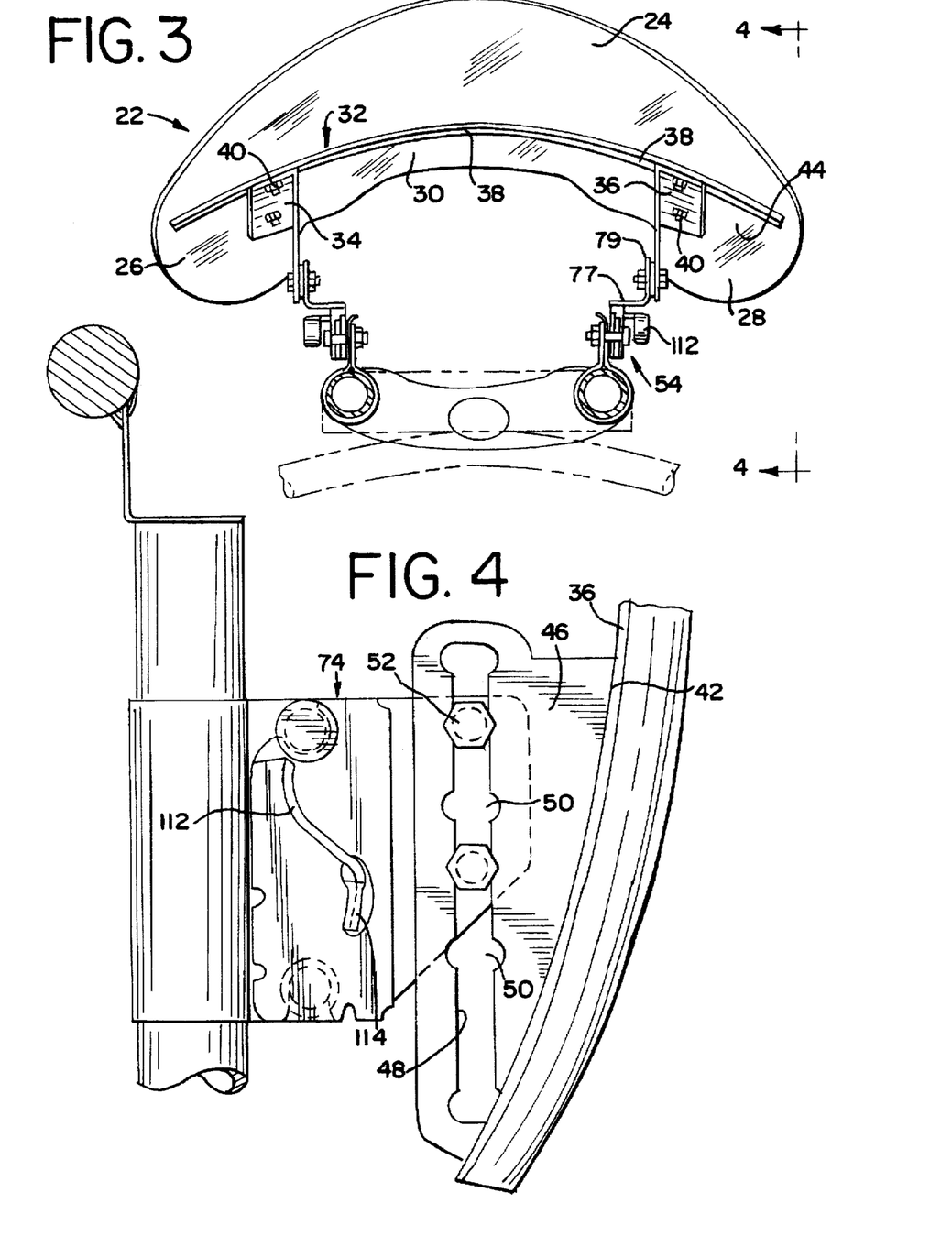
FIG. 3 is a top plan view of a portion of the shield in a position of use, with the fork and handlebars of the motorcycle being shown in phantom lines.
FIG. 4 is an enlarged side elevational view of the shield of FIGS. 1-3, taken along lines 4—4 of FIG. 3.

Referring now to the drawings in greater detail, FIGS. 1-3 show one preferred form of demountable windshield assembly generally designated 10. The assembly 10 is secured to a fork assembly generally designated 12. Between the fork assembly and the shield or other accessory 10 are a pair of mirror image but otherwise identical left and right hand docking assemblies 14, 16. The docking assemblies 14, 16 being identical except for being mirror images of the other, only one assembly 16 will be described as shown, a vehicle mounted, stationary component generally designated 18 is affixed to an upper portion of the fork assembly 12 and the exemplary right hand docking assembly 16 also contains an accessory-mounted or movable component generally designated 20 that is so called because it is fixed to the shield 10 or other demountable accessory.

In describing the parts and their mounting to the motorcycle, it will be understood that the construction of the handlebars and other parts of the motorcycle front fork assembly is illustrated in a somewhat schematic manner only. As known to those skilled in the art, the motorcycle fork assemblies customarily include upper and lower so-called triple clamps, each positioning a pair of fork tubes and being movable about a center bolt or the like. The upper ends of the fork tubes may be of any form of construction, and may optimally be provided with decorative covers of various kinds. The exact construction of the upper portion of the fork tubes or fork tube covers, and the construction of the triple clamps or other portions of the motorcycle are not of critical importance to the present invention, it being understood that the accessory mounting system may readily be made compatible with motorcycles made by all or almost all commercial manufacturers.

Referring again to the drawings, it will be noted that the shield assembly 10 may also be made in a variety of ways but for illustration is shown as including a transparent panel generally designated 22, and including a clear main upper panel 24, opposed clear side portions 26, 28 as well as a downwardly extending lower clear center panel portion 30. The shield assembly 10 also preferably includes a mounting frame generally designated 32 of generally inverted U-shaped configuration. The mounting frame includes left and right hand uprights 34, 36 and an interior crossbar 38 (FIG. 3). The uprights and the crossbar 34, 36, 38 are secured to exterior decorative covers (not shown) by plural fasteners 40 that extend through the uprights and crossbar to the decorative covers and sandwich the transparent material comprising the shield panel between these elements.

In the preferred form of invention, each of the uprights 34, 36 includes a shield mounting portion 42 that is contoured so as to be parallel to the rear surface 44 of the shield 10. A contoured, apertured flange 46 serves as an adjustable positioner for the movable component 20 of the docking assembly 16. The flange 46 includes an elongated slot 48 with enlarged diameter openings 50 at both ends and spaced apart along the extent of the slot 48. The flange 42 utilizes fasteners 52 to secure the flange 46 to its associated docking assembly 16. The construction to be described enables an extremely rapid and secure mounting to be achieved and also permits instantaneous removal of the accessory because of its various features of construction and operation.

Thus, referring again to FIGS. 1 and 2 for example, the vehicle mounted, stationary component 18 comprises a bracket assembly generally designated 54 and including left and right hand halves 56, 58 that are fit tightly in a secure locked position over the upper portions of the fork assembly 12.

The bracket assembly 54 serves to position an upper anchor post 60 having an elongated shank 62 and an enlarged head portion 64, and also to position a lower anchor post 66 having a shank of reduced length and also having an enlarged head portion 70. The arrangement of the heads 64, 70 and the solid portion of the bracket halves 56, 58 insure that the movable component 20, when secured, cannot move either axially or radially of the posts 60, 62.

Referring now to the accessory mounted and hence relatively movable component 20, this element includes a releasable, preferably multi-position latching mechanism generally designated 72 and shown to include a latch mechanism housing generally designated 74. The housing 74 includes a main plate 76 which is contoured so as to include an offsetting flange 77 and a flange 79 secured to the apertured flange 46 to position the latch housing 74. The housing 74 also includes a cover plate 78 which is generally congruent with the main plate, and which is positioned relative thereto with the aid of alignment tabs 80.

Figure 5:
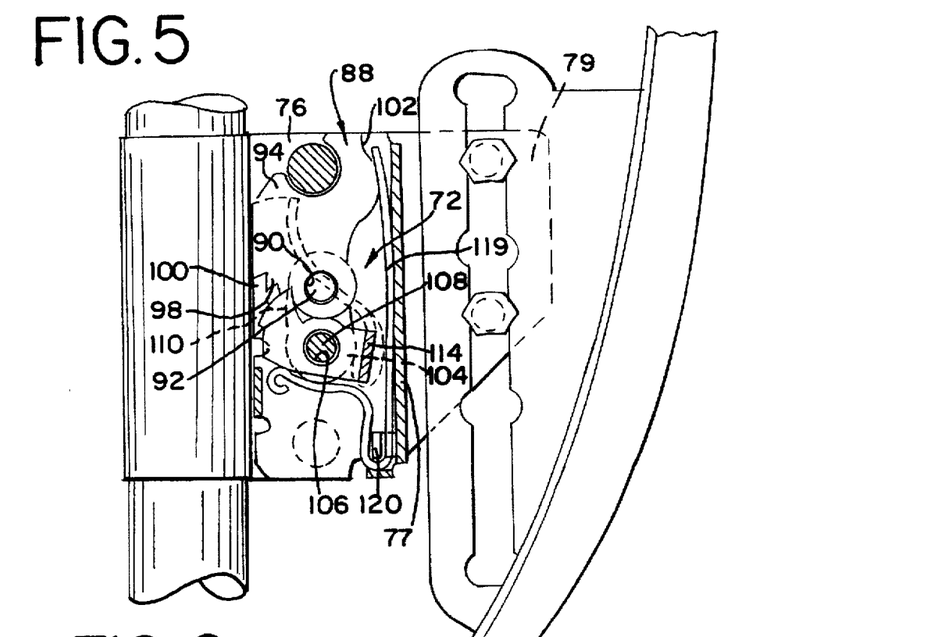
FIG. 5 is a side elevational view, with portions in sections, showing the locking mechanism of the accessory mounting apparatus in the fully installed and latched position of use.
Figure 6:
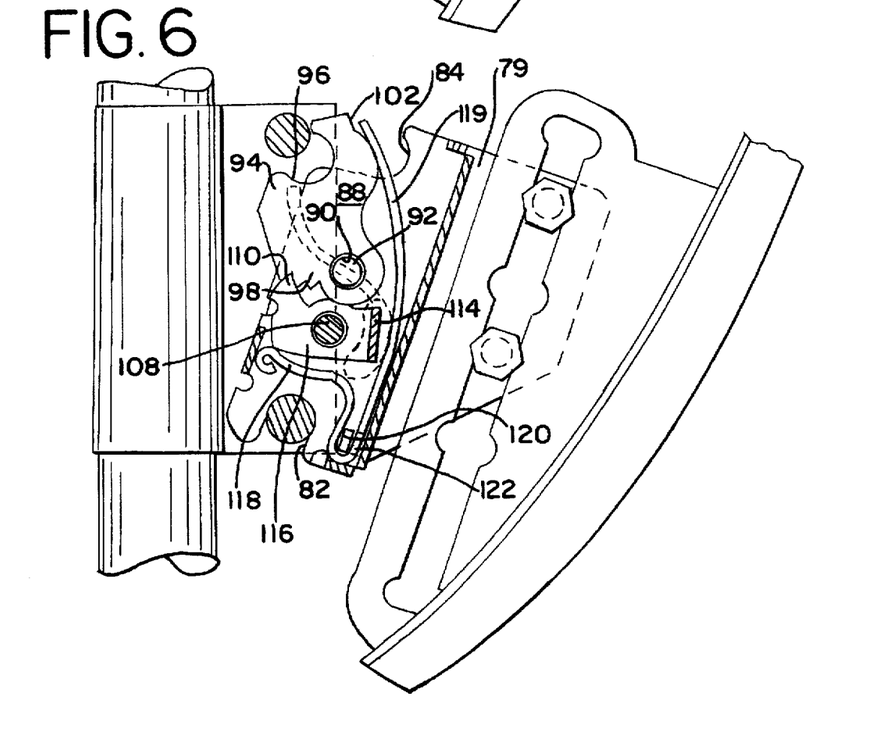
FIG. 6 is a view similar to that of FIG. 5, but showing the mechanism in a released or unlocked position, and the shield supported only by the lower anchor post and just prior to removal (or just prior to latching)

The main plate 76 includes a lower recess 82 adapted to engage the shank 68 of the lower anchor post 66, with the lower anchor post head 70 being then shrouded by the cover plate 78. Top reliefs or notches 84, 86 are provided in the main plate and the cover plate 76, 78 to provide access for an exposed end portion of a pivot latch generally designated 88. The pivot latch 88 includes a pivot pin opening 90 adapted to be spaced by only a working clearance from a pivot pin 92 (FIGS. 5 and 6). The pivot pin may preferably be in the form of a shoulder bolt or the like to serve the purpose of pivot pin as well as the function of a spacer for the plates 76, 78. A desirable feature of the mounting system is that the assembly is relatively thin, i.e., it is the thickness of two plates, the latch and slight working clearances.

The pivot latch 88 includes an upper end 94 having a contoured recess 96 adapted in use to engage the shank 62 of the upper anchor post 60. The portion of the pivot latch 88 adjacent the pivot pin opening 90 includes plural, spaced apart ratchet teeth 98 with notches 100 therebetween. As shown in FIGS. 5 and 6, a spring-engaging surface 102 is provided at a face of the latch 88 generally opposite the open end of the recess 96. As also shown in FIGS. 5 and 6, the quick release latching mechanism includes a locking pawl generally designated 104 and shown to include a pivot opening 106 through which a pawl pivot pin 108 extends. This pin 108 may likewise be a shoulder bolt similar to that of the pin 92.

The pawl 104 includes a claw 110, the tip portion of which engages one of the notches 100 between the ratchet teeth 98 in the latch 88. The pawl also includes a manually operable, contoured release lever 112 (FIG. 4) secured by a lever flange 114 to the pawl 104. If desired, a slightly enlarged cylindrical area can be provided where the pawl 104 is located relative to the main plate 76. This area can then receive the cylinder of a lock (not shown) and a lock barrel may then be placed concentrically within the cylinder, with the pin serving as the pivot for the pawl 104. By incorporating a lock in this way or in a similar arrangement, non-destructive theft of the windshield or other accessory can be prevented. The pawl 104 has a lower spring-engaging surface 116. One leg 118 of a contoured wireform spring 119 engages the surface 116, urging the claw end of the pawl upwardly. The wireform spring 119 is entrapped between the plates 76, 78 and a locating loop 120 formed on the main plate 76 extends into the lower bight portion 122 of the spring 119.

As will be apparent from FIGS. 1–2 and 5–6, mounting and dismounting the shield assembly 10 is the essence of simplicity. Assuming that the shield is in place and locked as shown in FIG. 5, the lower, post-engaging recess 82 has surrounded a significant portion (but one-half or less of the circumference of the shank 68) of the lower post 66, leaving only an opening near the bottom of the recess 82. The contoured recess 96 in the pivot latch 88 also partially surrounds the shank 62 of the upper posts 60, surrounding the same by perhaps 120°–180°. In the position just described (FIG. 5), the pivot latch 88 cannot be opened by counterclockwise movement about the pivot pin 92, because the pawl claw 110 engages a notch 100 in the latch 88. Movement in the clockwise direction is prevented by the presence of the spring and a flange portion of the main plate 76. In this position (FIG. 5), a mounting axis extends between anchor posts 60, 66 and the open ends of the recesses 82, 96 are positioned in generally oppositely facing relation. The closed or inner ends lie along the mounting axis. With such post-to-post mounting, the windshield is exceptionally secure, and the manner in which the recesses engage the shanks and head portions 62, 64, 68, 70 of the anchor posts and the flange portions of the bracket assembly prevent movement in any direction.

Functionally speaking, each of the recesses 82, 96 may be thought of as including outer, oppositely facing open or entry portions and inner, anchor-contacting portions that are illustrated as being semi-circular in form. These inner ends could have another shape that tapers toward the bottom or inner end of the recess. The positioning and latching action is preferably such that the accessory can initially be supported by resting the fixed recess on the lower anchor post 62, and then, as the accessory swings to an upright position, the latch moves about its pivot axis so the guide portions of the recess 96 register with and are ultimately retained by the second or upper anchor post 60.

In the open or withdrawn position of the latch 88, the contacting points lie closer to each other, with the latch pivot being substantially offset from the accessory mounting axis. In the latched position, the contacting portions are spaced farther apart and the pivot axis lies on or near the accessory mounting axis. One of the entry portions, preferably the lower one in the case of the windshield, opens generally downwardly with the upper entry portions being angled towards its anchor point where the pivot point is well outside the mounting axis. The pivot action changes the relation of these relative parts against the resistance of the spring but maintains the latched position by reason of the releasable pawl mechanism.

Thus, in the open position, the length of a line between anchor points by way of the pivot axis is much greater than is such length in the closed position. The two segments of such line have a sharp angle between them when the latch is open and a slight angle when it is closed.

Referring now to FIGS. 2 and 6, and assuming it is desired to remove the windshield, the operator positions his hands behind the shield, i.e., between the shield and the forks, and engages the top portion of the release lever 112 (see FIG. 4) with his fingers, moving it counterclockwise. This action releases the pawl claw 110 from the notch 100, permitting the open latch recess 96 to pivot counterclockwise. This in turn releases the recess from the upper anchor post shank 62. At this point, the entire shield assembly may pivot about the shank 68 of the lower anchor post 66. Here, the closed upper end of the recess 82 serves to support the weight of the shield, and the open end portion of the recess 82 remains open downwardly. Accordingly, when the shield has been rotated to a position just clockwise of that of FIG. 6, the shield can be simply lifted up and away from the fork assembly 12. Thus, the left and right hand docking assemblies 14, 16 permit stationary and movable components 18, 20 to separate from each other. Thereafter, the stationary components 18 remain mounted on the vehicle and the accessory mounted or movable component 20 remains mounted on the shield.

Installing the shield is done in the opposite sequence, i.e., positioning the recesses 82 with their closed ends overlying the shanks 68 of the lower posts and simply rotating the shield into its position of use. With this action, the walls defining the open end of the contoured recess 96 in the pivot latch 88 engage the shank 62 of the upper post 60 and continued movement simply pivots the latch 88 about its own pivot point against the force of the spring 119. In so doing, the pawl claw clicks over the ratchet teeth 98, successively engaging the notches 100 until the innermost notch is engaged.

The provision of two or three notches provide an extra safety feature in that, if an extreme jarring or the like were to momentarily dislodge the locking pawl, the spring loaded action would cause the pawl to engage the adjacent notch. In the preferred form of design, two or three notches are provided for the purpose of providing a safety feature, and these audible clicks enable the operator to confirm proper and complete installation.

Figure 7:
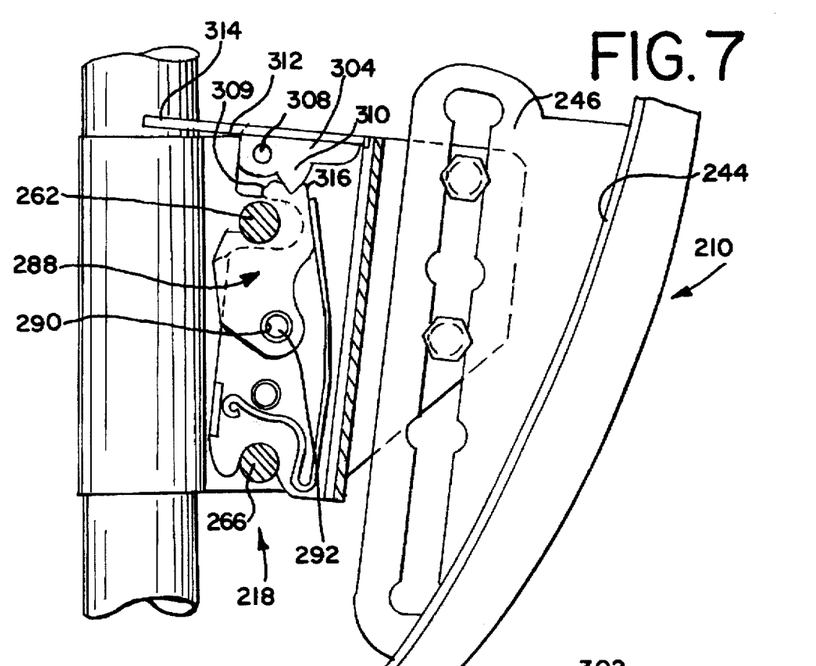
FIG. 7 is a view of an alternate form of locking mechanism made according to the invention and showing the same just before or after latching.
Figure 8:
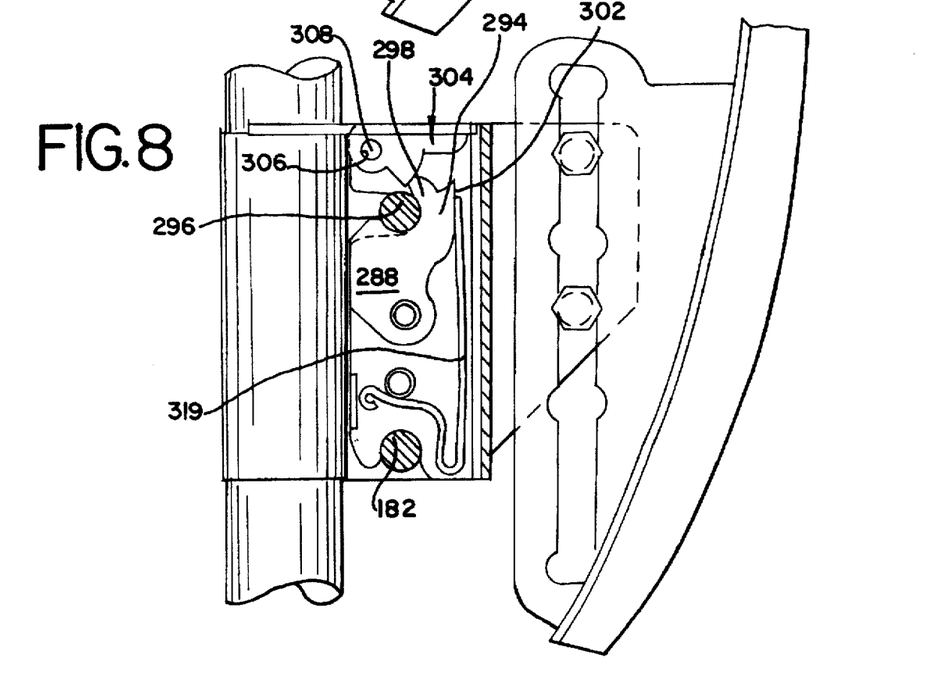
FIG. 8 is a view similar to that of FIG. 7, showing the latching mechanism in the fully installed position of use.
Figure 9:
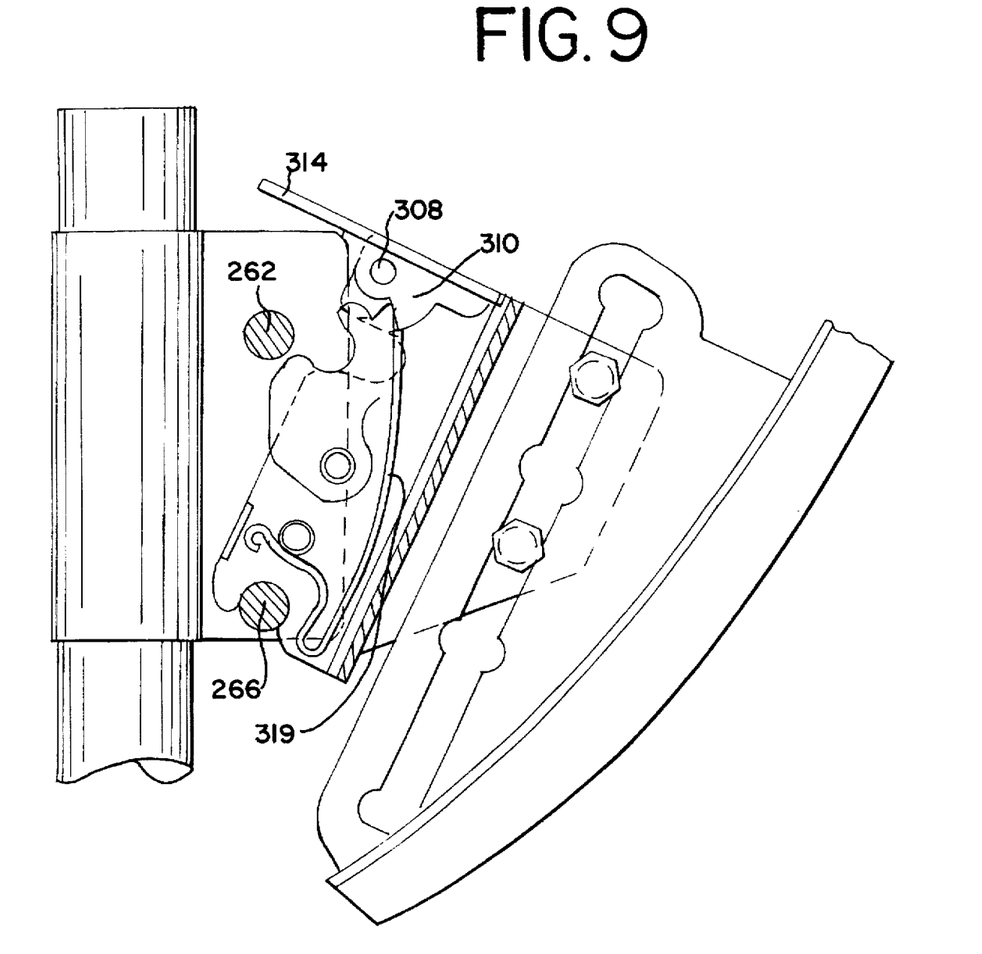
FIG. 9 is a view of the mounting mechanisms of FIGS. 7 and 8, showing the same in a completely open or released position, but supported by the lower anchor post.

Referring now to FIGS. 7-9, a similar arrangement is depicted, except that the construction and arrangement of the locking pawl, and certain parts of the pivot latch differ somewhat from their earlier described counterparts. Thus, FIGS. 7-9 show a windshield generally designated 210 which is otherwise similar to its counterparts including the provision of the apertured flange 246 extending rearwardly from the rear surface 244 of the shield mounting portion. The construction of the vehicle-mounted or stationary components 218 are identical to those of their counterparts 18, i.e., upper and lower posts 260, 266 are positioned in the same way. The pivot latch 288 is similar in that it includes an opening 290 to receive a pivot pin 292.

The upper portion 294 includes a contoured, open ended recess 296 for engaging the shank 262 of the upper post 260. While the spring engaging surface 316 of the latch 288 is similar to that of its counterpart, the ratchet mechanism is located nearer the open end of the recess. A locking pawl 304 is provided to engage the latch 288. The pawl 304 has an opening 306 for a pivot pin 308 which extends above the axis of the upper anchor post 60. The locking pawl 304 includes a claw 310 which extends into contact with an end face 309 on the latch upper end, or into one of the notches.

As in the other construction, a spring 319 urges the pivot latch to a counterclockwise or open position, but the claw portion 310 of the locking pawl 304 prevents this action from occurring unless the release lever 312 is depressed so as to pivot the pawl claw 310 out of the way of the pivot latch 288.

In this embodiment, it is simply necessary to push down the finger-engaging end 314 of the locking pawl momentarily. When the shield assembly is installed, the upper and lower recesses 282,296 engage the posts 260, 266 to secure the shield in place.

FIGS. 5-9 also show that the elongated slots 48 and the openings 50 enable the fasteners 52 to be manipulated so as to position the docking assemblies in the desired relation to the shield itself.

The accessory illustrated as being mounted through the use of the novel docking system is a windshield. However, it will be appreciated that similar components may be positioned on any demountable accessory, such as a travel trunk, a saddlebag, or other accessory. The posts have been illustrated as vertically aligned, but the principles of the invention are applicable, with suitable modifications, to having the docking points or posts spaced horizontally apart from each other. As long as the notches and recess in the pivot latch are correctly contoured, releasing and latching may be done securely and effectively.

It will occur to those skilled in the art that the male/female relation of certain of the parts and the movable/fixed relation may be changed as desired by the operator. In the present specification, and in the claims, the expression "fixed"is intended to mean fixed in relation to the vehicle, it being understood that the vehicle itself is mobile.

The principles of the latching mechanism are combined effectiveness and simplicity. In order to release or tighten the assembly, depending on the intent of the user, the closed ends of the recesses are moved closer together (released) or farther apart (engaged), thus effectively lengthening the distance between the recesses to provide a latching operation. During the expansion or latching process, the pivot pin of the pivot latch moves closer to the mounting axis, i.e., the imaginary line connecting the spaced apart anchors. For removal, the latch moves such that the open end of the recess moves toward the other recess as the pivot pin moves away from the mounting axis. In the fully latched position, the pivot pin may but need not lie along this axis.

Referring now to other aspects of the invention, the release lever from the pawl has been illustrated as being in two different locations, one lying outside each of the mounting brackets and the other at the top of the mounting bracket and offset from the forked tube. Other arrangements are suitable. Various arrangements of bracketry are provided for locating the locking mechanism relative to the posts or anchors.

In a preferred form of apparatus, the plates and movable parts of the latch mechanism are preferably made from cold rolled steel which may have a chrome plated or other bright finish. For most commercial applications, the area wherein the pawl 104 engages the ratchet teeth 98 on the pivot latch 88, damaging wear is a distinct possibility. Accordingly, a high carbon, heat treated steel is preferably used in the construction of the pawl and lever, and in the construction of the pivot latch. Suitably hardened materials will last indefinitely. Stainless steel is also especially attractive for several applications. Particularly in the case of lightweight accessories, engineering plastics may be used for the product.

The dimensions and proportions of the components of the products embodying the invention may be changed. In some instances, it is desirable to space the innermost portions of the docking points or anchors a given distance apart, and arrange for the bottom or inner ends of the recess to be spaced apart by such a distance plus an extra 0.020 inches in the fully locked position, for example. This much interference is able to be taken up in working clearance and by the slight deflections of the anchors and other parts of the mechanism under load. This insures a rattle-free, securely locked positioning of the mounted accessory.

In the preferred form, the spring that is biasing the pivotable latch does so with a relatively strong force so that when the release levers are actuated, the top portion of the mounting is virtually ejected from the anchor points. The semi-circular or other contoured portion of the recess 82 in the fixed plate aids the operator in retaining control of the windshield but insuring that it is moved well away from the docking points. Thereupon, a simple lifting operation will remove the shield. In use, the weight of the shield is borne by the contact between the plate itself rather than a spring retained portion of the locking mechanism. If for some reason it were desired to position the accessory mounting axis horizontally, the contours of the recess might be somewhat different, i.e., the length and contour of these parts could be modified suitably.

The illustrated arrangement of spring, pivot latch and pawl are constructed so that there is a comparatively strong spring force urging the latch 88 into an open position. The spring force should be great enough to unlock the latch and thrust the windshield forward and slightly upward into a position from which it may readily be removed from the anchors. Consequently, the contact points between the spring and the latch are arranged so as to provide a strong mechanical advantage to the parts biasing the latch open. Consequently, the spring has a long free length, is preloaded, and preferably acts on a portion of the latch that is spaced significantly apart from the latch pivot point.

In regard to the release lever for the pawl 104, the spring should act to strongly urge the pawl into the notches, and hence, the spring contact point will be spaced significantly apart from the pivot point of the pawl. However, the release lever should be constructed and arranged so that the finger-engaging portion thereof is spaced significantly farther from the pawl pivot point than is the force application point of the spring. Accordingly, it will be easy for the user to move the pawl by using the mechanical advantage of the release lever, whereas a much stronger force would be required to release the pawl if releasing forces were placed directly upon it at a point opposite the point whereat the spring contacts the pawl. By using a single spring with separate active portions, a simple movement of the release lever will release the latch and eject the windshield.

In one preferred form of apparatus, a single spring is provided with two functioning end portions that respectively bias the pawl and latch. In the other embodiment, separate springs are provided for biasing these components. Such an arrangement could be modified such that other resilient force applying means could be used. In some instances, bearing-mounted brackets could be used to reduce the sliding friction characterizing the mechanism.

Two preferred embodiments of the invention having been described in detail, it is anticipated that modifications and variations to the described forms of apparatus will occur to those skilled in the art and it is anticipated that such alterations and changes may be made without departing from the spirit of the invention of the appended claims.

I claim:

1. A demountable accessory positioning system for use with a motorcycle having an accessory mounting area and an accessory removable therefrom, said system comprising, in combination, a pair of anchors fixed to one of said motorcycle and said accessory and spaced apart along a given line forming an accessory mounting axis, a releasable latching mechanism carried by the other of said motorcycle and said accessory, said latching mechanism including a first recess having an open end and a closed end with portions snugly engagable with and pivotable about one of said anchors, and at least one latch element having a second recess including an open end and a closed end defined by surfaces for snugly engaging said other anchor, a pawl having a portion for engaging a portion of said latch element and a release lever, said latching mechanism also including a resilient member urging said latch and said pawl in predetermined directions, said latch element being mounted for movement about a pivot axis and being movable between a closed position wherein said latch recess engages and at least partially surrounds said other anchor and said pivot axis lies adjacent said accessory mounting axis, and an open position wherein said latch pivot axis is spaced apart from said accessory mounting axis, said recess closed end is withdrawn from said other anchor and said recess open end faces across said mounting axis at an angle.

2. An accessory positioning system as defined in claim 1, wherein said anchors are fixed to a portion of said motorcycle.

3. An accessory positioning system as defined in claim 1, which further includes a second pair of anchors, wherein one of said pair of anchors is fixed to each of a pair of front fork tubes forming a part of said motorcycle.

4. An accessory positioning system as defined in claim 3, wherein said anchors are in the form of pairs of headed posts, each pair being disposed in generally parallel relation to the long axis of said forks.

5. An accessory positioning system as defined in claim 1, wherein said releasable latching mechanism is carried by a motorcycle windshield.

6. An accessory positioning system as defined in claim 1, wherein said latch includes plural teeth and said latch-engaging pawl is constructed and arranged to engage different teeth in different positions of said latch, whereby said mechanism provides for positioning said latch in at least one position intermediate said closed position and said open position of said latch.

7. An accessory positioning system as defined in claim 1, wherein said plural teeth on said latch and said latch-engaging pawl are constructed and arranged so that installing said accessory creates an audible ratcheting sound indicating positive engagement between said teeth and said pawl, and enabling the user to confirm that said accessory is in a fully installed position.

8. An accessory positioning system as defined in claim 1, which includes a second pair of anchors, each of said pairs of anchors being positioned rigidly with respect to the front fork tubes of a motorcycle, wherein said accessory is a windshield, and wherein said latching mechanism comprises a pair of substantially identical, mirror image latching mechanisms, one for each set of anchors carried by said fork tubes.

9. An accessory positioning system as defined in claim 1, wherein said resilient member is a wireform spring, said spring having one portion urging said latching mechanism to an open position in order to serve as an accessory ejector when said release lever is actuated, said spring having another portion urging said pawl into engagement with said latch so as to prevent unintentional release of said positioning system.

10. An accessory positioning system as defined in claim 1, wherein said latching mechanism further includes a fixed plate and said first recess is formed in said plate, said mechanism being further characterized in that said latching mechanism, in use, is positioned above said first recess, whereby said accessory may be supported by engagement between said first recess and said one anchor prior to engaging said other anchor with said latch.

11. A releasable latch assembly for securing an accessory to a motorcycle that includes a pair of spaced apart anchors forming docking points for said accessory, said anchors being spaced apart along an accessory mounting axis, said mechanism including a baseplate, a cover plate, and disposed between said baseplate and said cover plate, a latching mechanism including a pivot latch movable about a pivot axis between open, closed, and intermediate positions, a pawl and pawl release lever for controlling the position of said latch, at least one spring urging said latch to one position and urging said pawl into contact with said latch, at least one of said baseplate and cover plate including a first contoured recess having an anchor-contacting portion and an entry portion, said latch also including a second contoured recess with an anchor-contacting portion and an entry portion, with said latch being constructed and arranged so that, in a closed position, said anchor-contacting portions of said recesses are spaced apart a given distance that is at most a working clearance from said anchors, and said entry portions are in generally oppositely facing relation along said mounting axis, and, in the open position of said latch, said anchor-contacting portions lie closer to each other than said given distance and said entry portions are facing across said mounting axis in substantially inclined relations.

12. A releasable latch assembly as defined in claim 11, wherein said pawl release lever includes a flat, finger contacting portion lying generally perpendicular to the extent of said baseplate and said cover plate, said release lever being movable through an arcuate opening in said one of said baseplate and cover plate.

13. A releasable latch assembly as defined in claim 11, wherein said at least one spring comprises a wireform spring having one end in contact with a portion of said latch and another end in contact with a portion of said pawl.

14. A releasable latch assembly as defined in claim 11, wherein said at least one spring comprises two springs, one having portions in contact with said latch and the other having portions in contact with said pawl.

15. A releasable latch assembly as defined in claim 11, wherein said first contoured recess is formed in said baseplate.

16. A releasable latch assembly as defined in claim 11, wherein, in the closed position of said latch, said pivot axis intersects a line parallel to and closely spaced apart from said accessory mounting axis, and, in said open position, said pivot axis is spaced apart from said accessory mounting axis.

17. A releasable latch assembly as defined in claim 11, wherein said first contoured recess is formed in said baseplate and wherein said cover plate includes a portion covering said first recess, whereby, when one of said anchors comprises a headed post, said cover plate will cover the head of said post, said first recess will engage the shank portion of said post and the head of said post will be arranged generally co-planar with said latch and said pawl and will lie between said baseplate and said cover plate.

18. A motorcycle windshield assembly adapted for ready attachment and removal from an associated motorcycle, said windshield including a transparent windscreen portion, at least one windshield support unit having portions secured to a rear surface of said windscreen in facing relation, said support unit also having a pair of mounting brackets affixed thereto, each of said mounting brackets carrying a releasable, multi-position attaching system, said attaching system comprising, for each of said mounting brackets, a baseplate, a cover plate, and disposed between said baseplate and said cover plate, a latching mechanism including a pivot latch movable about a pivot axis between open, closed, and intermediate positions, a pawl and pawl release lever for controlling the position of said latch, at least one spring urging said latch to one position and urging said pawl into contact with said latch, at least one of said baseplate and cover plate including a first contoured recess having a closed end portion and an entry portion, said latch also including a second contoured recess with a closed end portion and an entry portion, with said latch being constructed and arranged so that, in a closed position, said closed end portions of said recesses are spaced apart a given distance, and said entry portions are in generally oppositely facing relation along a given line, and, in the open position of said latch, said closed end portions lie closer to each other than said given distance and said entry portions are facing across said given line in substantially inclined relations.

19. A windshield assembly as defined in claim 18, wherein said one position to which said latch is urged by said spring is said open position, whereby, when said pawl release lever is released, said spring pushes said latch to said open position and ejects said closed end of said second recess from the portion of said motorcycle to which said windshield was removably secured.

20. An accessory positioning system for use with a motorcycle having an accessory mounting area, said system including a pair of anchors each fixed to a portion of said motorcycle and spaced apart along a given line forming an accessory mounting axis, and a positioning and latching mechanism comprising, in combination, a mounting plate having a portion affixed to a part of said accessory, said mounting plate having a latch element mounted for pivotal movement about a pivot axis and including an outer end portion having walls defining a recess with an open end and a closed end portion and a portion including spaced apart ratchet teeth, a pawl having a release lever, and a portion engagable with at least one of said ratchet teeth, said latching mechanism further including at least one spring having portions engaging said latch and said pawl, said mounting plate also having portions defining a recess with open and closed ends, said closed end portions of said recesses in use contacting the facing portions of said anchors and being urged into contact with said anchors, and with said inner ends of said recesses being spaced apart a given distance when said latch is in a closed position, said latch being pivotable to an open position wherein said recess is moved out of contact with one of said anchors, said latch element recess then having its closed end lying closer than said given distance to said closed end of said mounting plate recess.

21. A motorcycle accessory system including a demountable accessory and a pair of anchors fixed to said motorcycle and spaced apart along an accessory mounting axis, said accessory having a mounting plate affixed thereto, said mounting plate including a first anchor-engaging recess and carrying a positioning and latching mechanism comprising, in combination, a pivotally movable latch element, with a second anchor-engaging recess forming one part of said latch and spaced apart ratchet teeth on another part of said latch, said mechanism further including a pawl having one portion engagable with said ratchet teeth, and another portion serving as a release lever, a latch and pawl operating spring, each of said latch and said pawl having a spring engaging portion, said latch being movable between a closed position wherein said accessory is secured to said anchors, said recesses then having their open ends directed opposedly along said mounting axis and their closed ends spaced a given distance apart and in contact with said anchors, and an open position wherein said closed recess ends are more closely spaced than said given distance, said latch movement being controlled by said pawl, with said spring biasing said latch to said open position and said spring also biasing said pawl into engagement with said ratchet teeth.

22. A motorcycle accessory system as defined in claim 21, wherein said latch pivot axis lies closely adjacent and generally perpendicular to said mounting axis when said latch is in said closed position and wherein said mounting axis is spaced substantially apart from said mounting axis in the open position of said latch.

* * * * *